June 26, 1956      P. P. NEWCOMB      2,751,749
LUBRICATING AND STARTING SYSTEMS FOR GAS TURBINES
Filed June 27, 1951
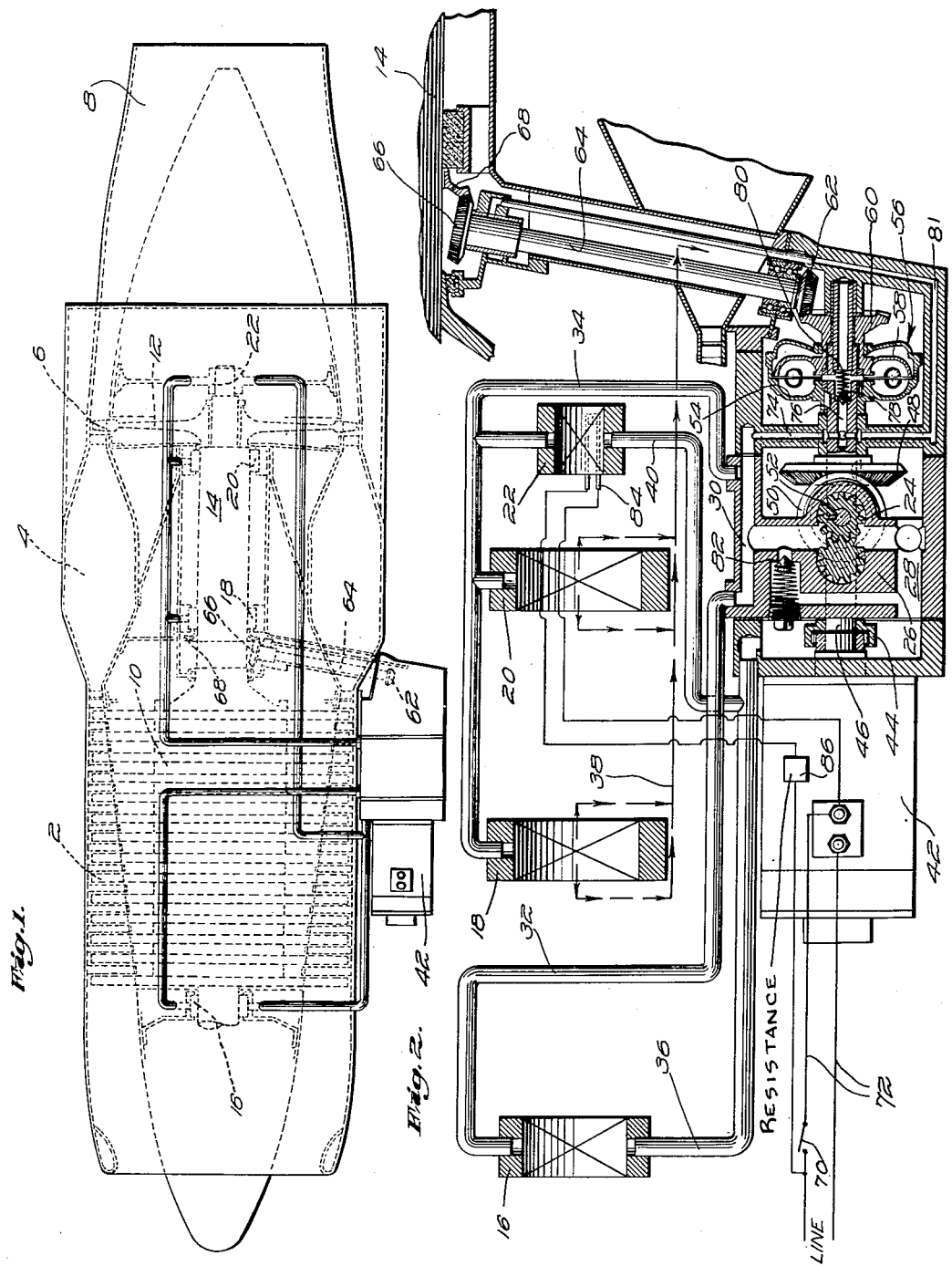
Inventor
Philip P. Newcomb
by Charles A. Warren
Attorney

United States Patent Office 2,751,749
Patented June 26, 1956

2,751,749

LUBRICATING AND STARTING SYSTEMS FOR GAS TURBINES

Philip P. Newcomb, Manchester, Conn., assignor to United Aircraft Corporation, East Hartford, Conn., a corporation of Delaware Application June 27, 1951, Serial No. 233,772

8 Claims. (Cl. 60—39.08)

This invention relates to lubricating and starting systems for gas turbines so arranged that an adequate supply of lubrication for the bearings will be provided before the power plant is started.

Gas turbines, particularly for use in aircraft, are generally supplied with lubrication from a pump driven by the turbine rotor so that no lubricant is available until the rotor has been turning long enough to develop the required pressure in the lubricant pumps. Because of the high speed at which the rotor operates it has been found desirable to provide a supply of lubricant prior to starting of the power plant. A feature of the present invention is an arrangement by which to assure an adequate supply of lubricant for the bearing or bearings before the rotor is set in motion.

Another feature of the invention is an arrangement of the starting system such that a lubricant pump is first set in operation and when the bearings are supplied with lubricant the cranking means for the rotor is then put into operation. More specifically a feature of the invention is the incorporation of a fluid coupling in the starter drive so that fluid from the lubricant pumps will be supplied to the coupling after the lubricant system is full of fluid.

After the gas turbine power plant is shut down it has been found from experience that the heat remaining in the power plant particularly in the combustor and in the turbine will frequently cause overheating of the rotor bearings, particularly those adjacent to the turbine. A feature of this invention is an arrangement of the lubricant pumps such that after shut down of the power plant the pump will be put into operation if the temperature of a bearing or bearings exceeds a predetermined temperature.

Other objects and advantages will be apparent from the specification and claims, and from the accompanying drawings which illustrate an embodiment of the invention.

Fig. 1 is a side elevation of a gas turbine power plant with the lubricant supply for the bearing shown diagrammatically.

Fig. 2 is a schematic view of the lubricant system showing the arrangement of the starter.

Referring first to Fig. 1, the gas turbine power plant is shown diagrammatically and includes a compressor 2, a combustor 4, a turbine 6, and a thrust nozzle 8. The compressor and turbine have rotors 10 and 12, respectively, which are interconnected by a shaft 14. The rotor assembly is journalled in spaced bearings 16 and 18 on opposite sides of the compressor and bearings 20 and 22 on opposite sides of the turbine rotor.

Lubricant for the bearings is provided by a pump 24 located in a housing 26 and functioning to pump lubricant from a sump 28 through a passage 30 in the housing and through connecting ducts 32 and 34 to the several bearings. Scavenge oil from the bearings is returned to the sump through drain lines 36, 38 and 40, line 38 being shown schematically.

The oil pump 24 is driven from an electric motor 42 connected as through an overrunning coupling 44 to a shaft 46. The shaft may carry a bevel gear 48 meshing with a cooperating bevel gear 50 on one of the shafts 52 for the gear pump. The shaft 46 extends beyond the bevel gear and has mounted thereon the impeller 54 of a fluid coupling 56. The runner 58 of the fluid coupling is connected to a bevel gear 60 to drive the rotor assembly through a cooperating gear 62 on a shaft 64. The shaft 64 carries a pinion 66 on the end remote from the gear 62 which meshes with a gear 68 mounted on the connecting shaft 14 between the compressor and turbine rotors.

In the operation of the device, the starting motor 42 is put in operation by closing a switch 70 in the supply line 72. When this switch is closed the gear pump is started and pressure is built up in the passage 30 and in the connections to the bearings until all of the bearings are adequately lubricated. After a predetermined pressure is developed in the passage 30 on the delivery side of the pump, fluid then enters the fluid coupling through intersecting passages 74 and 76 in the housing 26 and shaft 46, respectively. A check valve 78 normally held closed by a spring 80 opens at the selected pressure and allows fluid to enter the coupling for starting the rotor. The passage 74 may continue past passage 76 to an intersecting passage 81 and thence to lubricate the bearing for shaft 64 adjacent gear 66. It will be understood that the shaft 64 so constricts the flow into the bearing as to permit pressure to build up in passage 74 to open valve 78.

After the power plant is operating, the switch 70 may be opened so that the electric motor 42 is stopped, the overrunning coupling 44 allowing the shaft 46 to rotate independently of the motor. The lubricant pump will continue to supply the fluid coupling with fluid so that the pump will be driven by the rotor assembly through the coupling. The usual pressure relief valve 82, which is set at a higher pressure than the valve 78, will prevent the building up of excessive pressures in the lubricating system.

When the power plant is shut down, the rotor stops and the lubricant pump stops. To prevent overheating of any one of the bearings, the one which is most subject to overheating, for example bearing 22, has adjacent thereto a thermostatically controlled switch 84 connected in parallel with the line switch 70 so that when the bearing 22 reaches the predetermined maximum allowable temperature the circuit through the motor 42 is closed and the lubricant pump is again put in operation. A suitable speed limitor, which may be a resistance 86, in the line through the thermostatic switch will prevent the motor 42 from running at a speed high enough to develop a delivery pressure in the pump high enough to open the valve 78 to the fluid coupling. With this arrangement the bearings will be supplied with lubricant which will function as a coolant when the bearings begin to overheat so that the bearings will not be damaged during the cooling down of the power plant.

It is to be understood that the invention is not limited to the specific embodiment herein illustrated and described, but may be used in other was without departure from its spirit as defined by the following claims.

I claim:

1. In a lubrication system for gas turbine power plants, a rotor, at least one bearing for the rotor, a pump for lubricant for the bearing, motor means for driving said pump, and a conduit from the pump to the bearing for supplying lubricant thereto, in combination with a driving connection from said driving means to the rotor including a hydraulic coupling between the pump and the rotor, a fluid connection from said pump to the coupling, and valve means in said fluid connection for admitting fluid from the pump to the coupling after lubricant reaches the bearing, said valve means being actuated by the fluid pressure in the fluid connection.

2. In a lubrication system for gas turbine power plants, a rotor, at least one bearing for the rotor, a pump for lubricant for the bearing, means for driving said pump, and a conduit from the pump to the bearing for supplying lubricant thereto, in combination with a driving connection from said driving means to the rotor including a hydraulic coupling between the pump and the rotor, a fluid connection from said pump to the coupling, and valve means in said fluid connection for admitting fluid to the ocupling after a predetermined pump pressure is reached.

3. In a lubrication system for gas turbine power plants, a rotor, at least one bearing for the rotor, a pump for lubricant for the bearing, means for driving said pump, and a conduit from the pump to the bearing for supplying lubricant thereto, in combination with a driving connection from said driving means to the rotor including a hydraulic coupling between the pump and the rotor, a fluid connection from said pump to the coupling, and pressure responsive means in said fluid connection for admitting fluid to said coupling when the pump pressure reaches a predetermined value.

4. In a lubrication system for gas turbine power plants, a rotor, at least one bearing for the rotor, a pump for lubricant for the bearing, means for driving said pump, and a conduit from the pump to the bearing for supplying lubricant thereto, in combination with a driving connection from said driving means to the rotor including a hydraulic coupling between the pump and the rotor, a fluid connection from said pump to said coupling, the latter being operable by fluid supplied to said coupling, and a pressure responsive valve in said fluid connection for admitting fluid to said coupling when the pump pressure reaches a predetermined value.

5. In a lubrication system for gas turbine power plants, a rotor, at least one bearing for the rotor, a pump for lubricant for the bearing, means for driving said pump, and a conduit from the pump to the bearing for supplying lubricant thereto, in combination with starting means for the rotor including said driving means, and pressure responsive means connected to said conduit and responsive to the lubricant pressure therein for enabling said driving means to turn the rotor when the pump pressure reaches a predetermined value and a releasable connection between said driving means and said rotor such that the driving means will not operate during operation of the power plant.

6. In a lubrication system for gas turbine power plants, a rotor, at least one bearing for the rotor, a pump for lubricant for the bearing, means for driving said pump, and a conduit from the pump to the bearing for supplying lubricant thereto, in combination with starting means for the rotor including a hydraulic coupling between said pump and rotor, a fluid connection from said pump to the coupling, and pressure responsive means in said fluid connection for admitting fluid from said pump to said coupling when the pump pressure reaches a predetermined value.

7. In a lubrication system for gas turbine power plants, a rotor, at least one bearing for the rotor, a pump for lubricant for the bearing, means for driving said pump, and a conduit from the pump to the bearing for supplying lubricant thereto, in combination with a driving connection from said driving means to the rotor, pressure responsive means responsive to the lubricant pressure from the pump for enabling said driving connection to operate when the pump pressure reaches a predetermined value, and an overrunning clutch between said driving means and said rotor.

8. In a lubrication system for gas turbine power plants, a rotor, at least one bearing for the rotor, a pump for lubricant for the bearing, means for driving said pump, and a conduit from the pump to the bearing for supplying lubricant thereto, in combination with a driving connection from said driving means to the rotor, pressure responsive means responsive to the lubricant pressure from the pump for enabling said driving connection to operate when the pump pressure reaches a predetermined value, and a releasable connection between the driving means and the pump and rotor such that the driving means will not operate during operation of the power plant.

References Cited in the file of this patent

UNITED STATES PATENTS

| | | |
|---|---|---|
| 557,650 | Chockley | Apr. 7, 1896 |
| 1,649,467 | Goodrich | Nov. 15, 1927 |
| 2,077,580 | Patterson | Apr. 20, 1937 |
| 2,102,514 | Clarkson | Dec. 14, 1937 |
| 2,155,218 | Cain | Apr. 18, 1939 |
| 2,393,833 | Steiner | Jan. 29, 1946 |
| 2,402,467 | Thompson | June 18, 1946 |
| 2,416,193 | Meyers | Feb. 18, 1947 |
| 2,526,197 | Cannon et al. | Oct. 17, 1950 |

FOREIGN PATENTS

| | | |
|---|---|---|
| 311,610 | Great Britain | May 16, 1929 |
| 899,626 | France | Aug. 28, 1944 |